July 7, 1942.  J. R. PUTNAM  2,289,038
PILOTAGE WATCH
Filed May 15, 1941  5 Sheets-Sheet 2
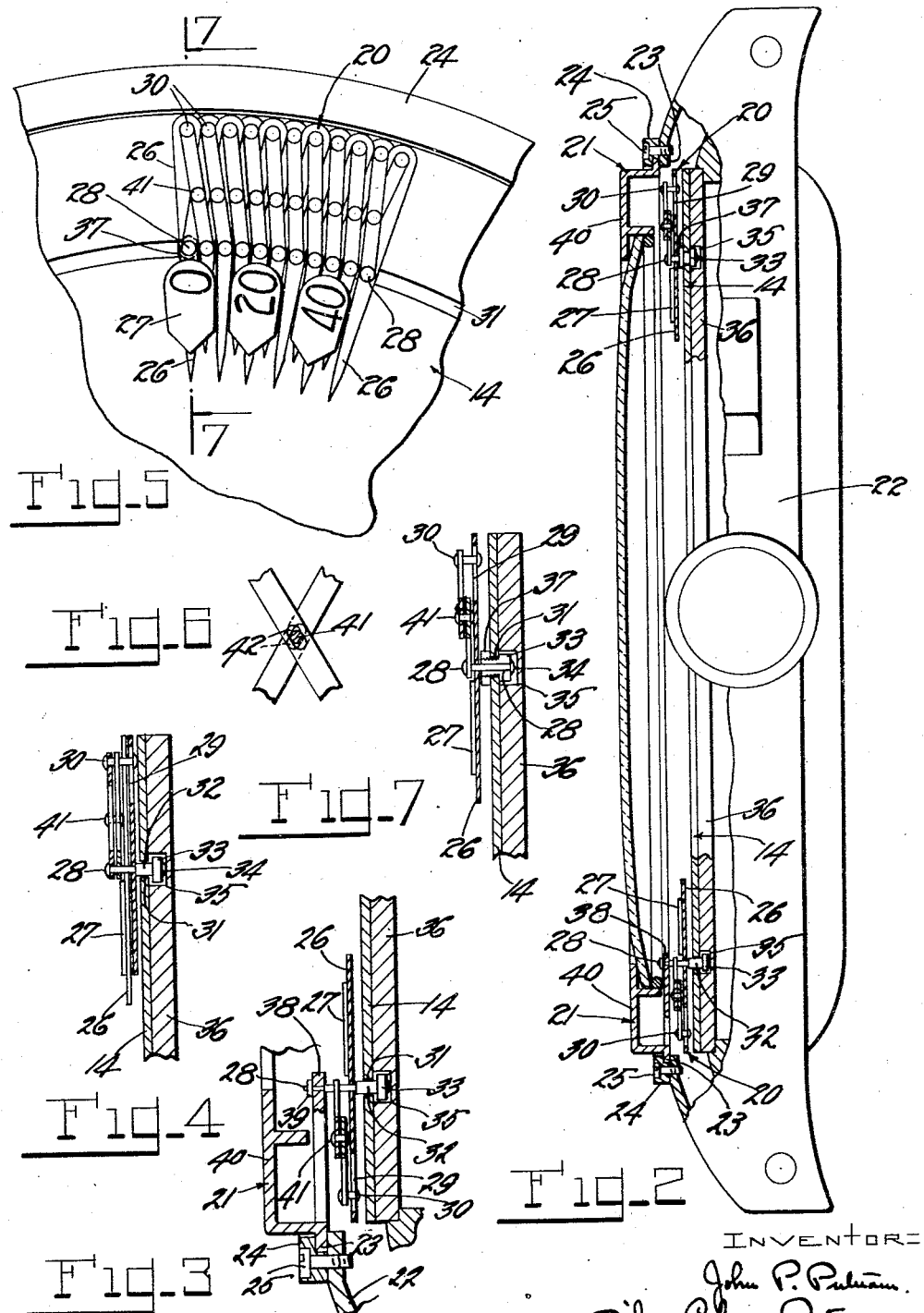

July 7, 1942.  J. R. PUTNAM  2,289,038
PILOTAGE WATCH
Filed May 15, 1941  5 Sheets-Sheet 3

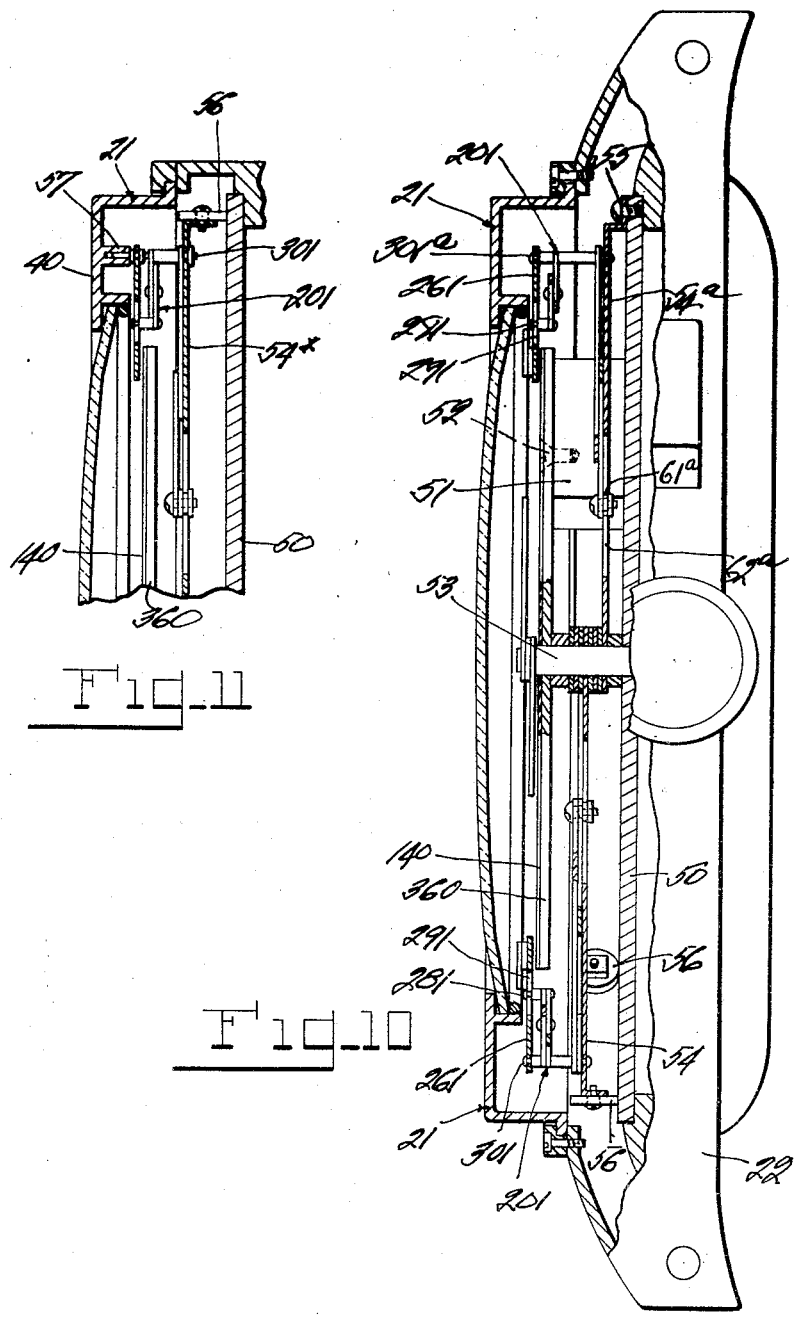

Patented July 7, 1942

2,289,038

UNITED STATES PATENT OFFICE 2,289,038

PILOTAGE WATCH

John P. Putnam, Boston, Mass., assignor to The Reece Button Hole Machine Company, Boston, Mass., a corporation of Maine Application May 15, 1941, Serial No. 393,517

18 Claims. (Cl. 58—126)

This invention relates to a watch or similar time piece adapted primarily, although not exclusively, to the navigation of aircraft. When used in connection with a suitable map and a scale by which distances can be measured thereon, it facilitates the practice of aerial pilotage by indicating directly, at any instant, and without computation, the distance traversed from a given point of departure, at a given or assumed ground speed, so that, by scaling this distance on the map, the position of the plane can be immediately ascertained at any time. Also, upon arrival over any recognizable landmark or check point, whose distance from a starting point is known or can be scaled on the map, and comparing this distance with the distance shown by the timepiece, said timepiece can, in the event of discrepancy, be reset to make the indicated distance agree with the actual distance, whereupon the instrument will automatically, immediately, and directly register the actual ground speed, which ground speed can as readily be rechecked and verified or corrected from time to time as other check points are reached.

The present invention therefore provides an instrument which, in conjunction with a map and a simple scale, can be employed to ascertain the actual ground speed at the moment of completion of an observation, and also to identify upon the map the position of the plane at any time whether the ground is visible or not, all without the necessity of the velocity-time-distance computations which have heretofore had to be made for these purposes, either mathematically or by the use of special slide rules or similar mechanical calculating devices.

In another application filed February 12, 1941, Serial No. 378,527, I have described an instrument, in the form of a special map gauge or scale, by which similar results can be accomplished in connection with an ordinary watch or similar timepiece, and the present invention utilizes, in a somewhat different manner, certain of the principles explained in said application to accomplish these results in connection with an ordinary or simple scale.

The invention will best be understood from the following description of certain forms or embodiments thereof shown in the accompanying drawings, these, however, having been chosen for purposes of exemplification merely, it being obvious that the invention, as defined by the claims hereunto appended, may be otherwise embodied without departure from its spirit and scope.

In said drawings:

Fig. 2 is a side view, partly broken away.

Figure 1:
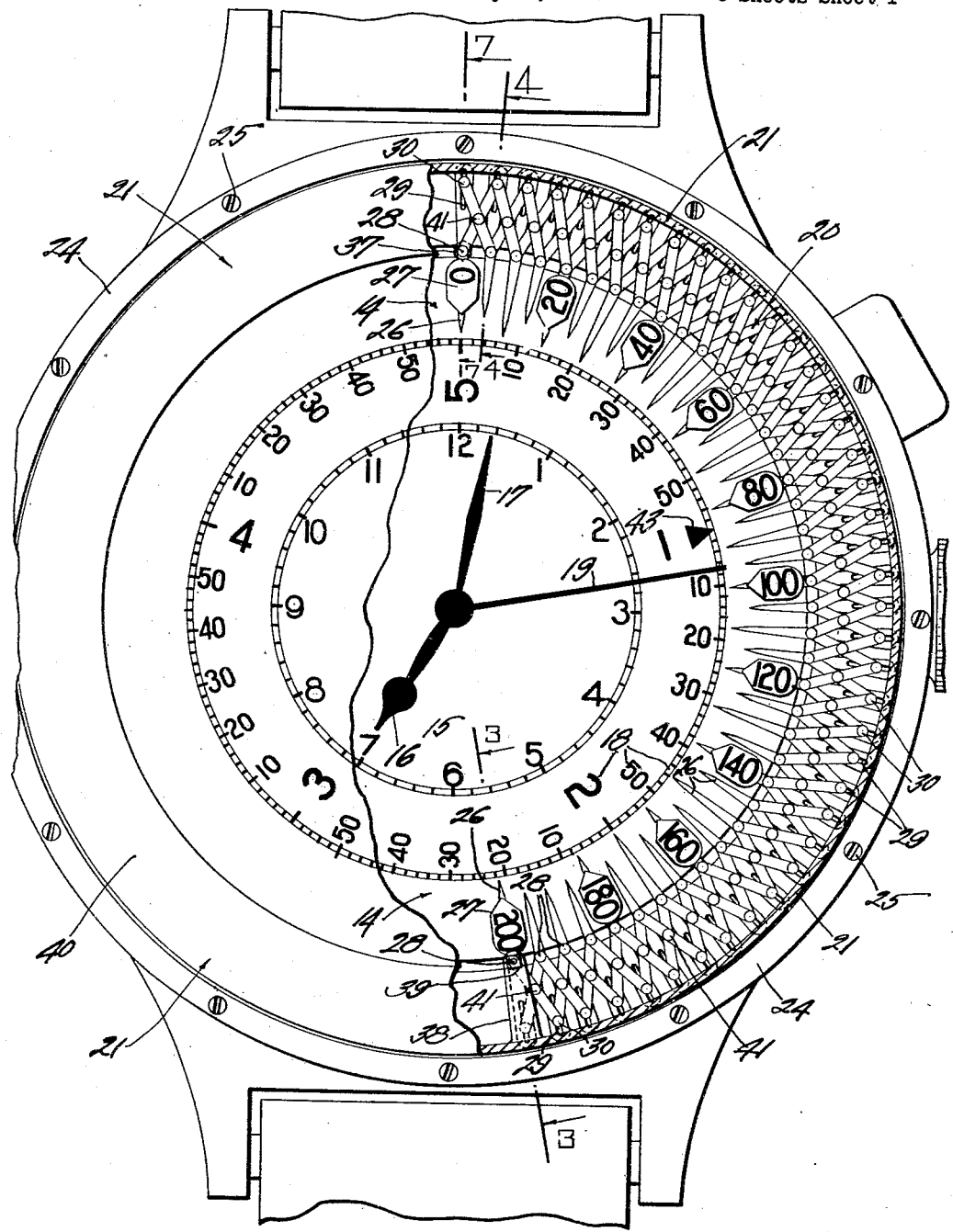
Fig. 1 is an enlarged face view, partly broken away, of a wrist watch embodying the invention.

Figs. 3 and 4 are further enlarged detail sections taken substantially on the lines 3—3 and 4—4, respectively, Fig. 1.

Fig. 5 is a fragmentary view, also further enlarged, of a portion of the extensible scale shown in Fig. 1, showing the same in its substantially completely contracted condition.

Fig. 6 is a fragmentary detail view of a portion of said scale.

Fig. 7 is a detail section taken substantially on the lines 7—7, Figs. 1 and 5.

Figure 8:
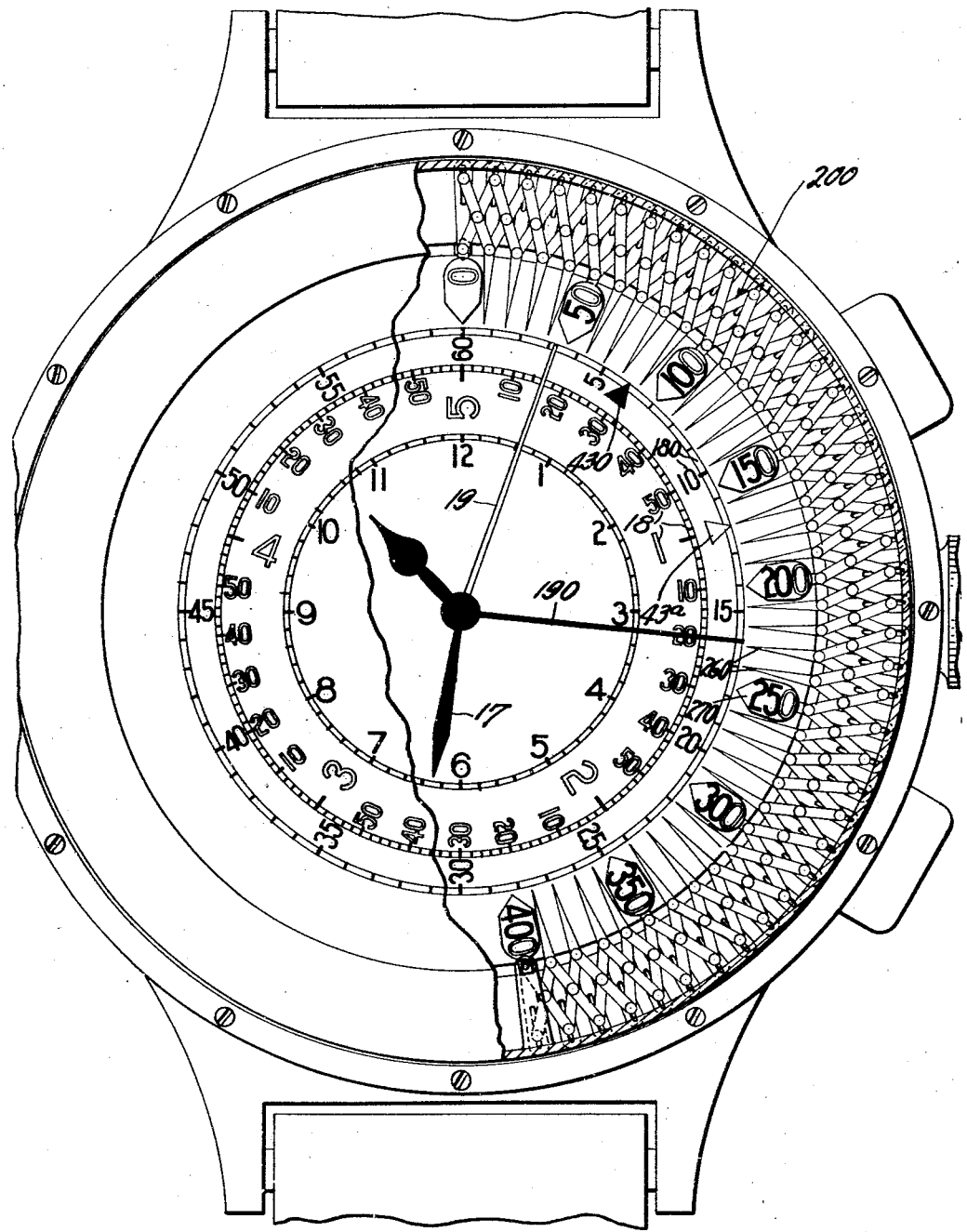

Fig. 8 is a view similar to Fig. 1 of a modification.

Figure 9:
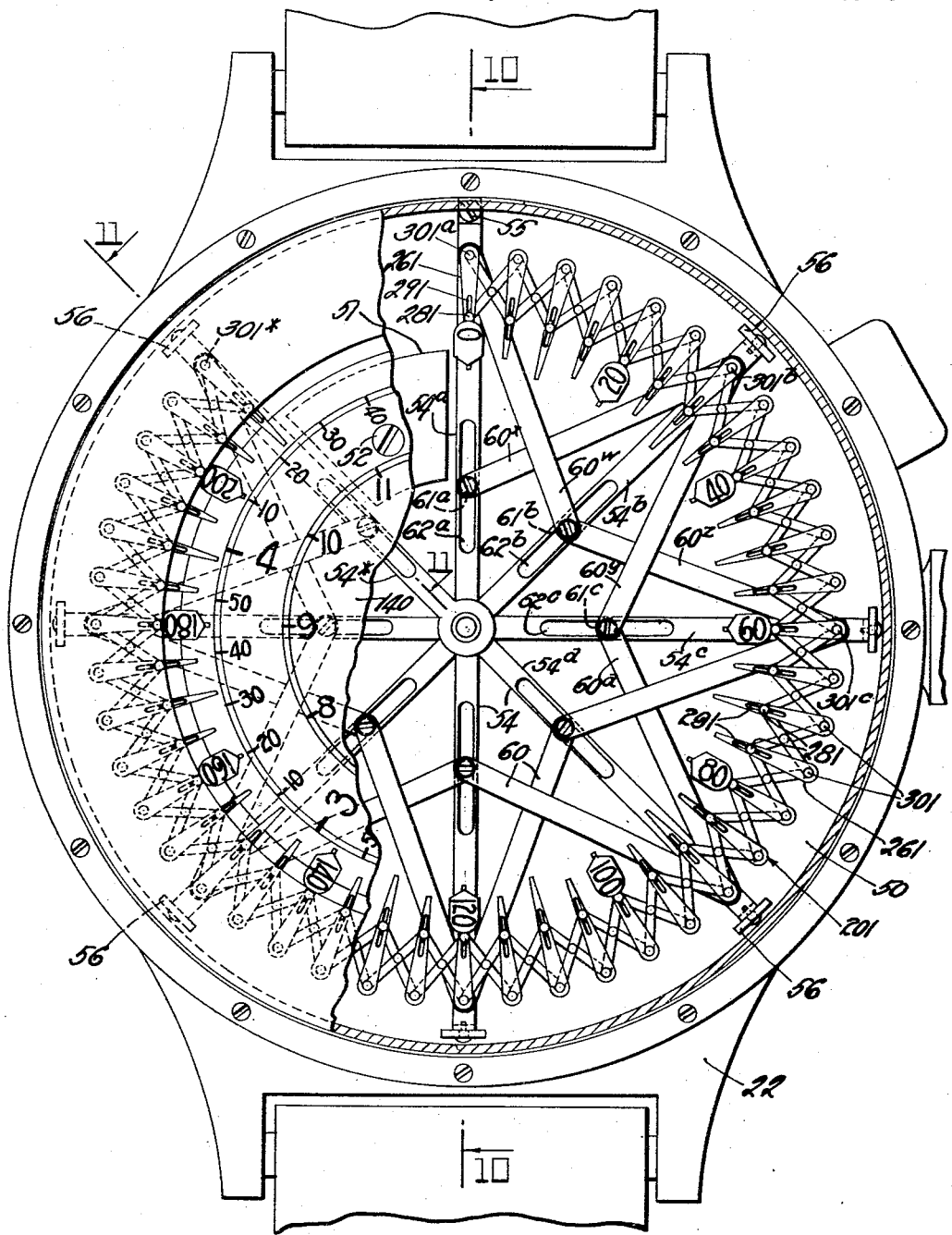

Fig. 9 is a view similar to Fig. 1, but with the dial and upper bezel flange partly broken away and the hands omitted, showing a further modification.

Figs. 10 and 11 are sections on the lines 10—10 and 11—11, respectively, Fig. 9.

Referring to Figs. 1 to 7, the invention is therein shown as applied to a wrist watch, although equally applicable to other timepieces, such as instrument board clocks.

In the construction shown, the dial 14 of the timepiece has a central portion 15 graduated about its edge in the usual manner in hours and minutes and over which are movable the usual hour and minute hands 16 and 17, respectively. These portions of the timepiece are common to nearly all watches and clocks, have nothing to do with the present invention, and may be omitted, but, for purposes of convenience, are preferably included.

Surrounding and disposed concentric with the dial portion 15 (when the latter is used) is a circular time scale 18 likewise graduated in minutes and hours, although preferably on a different basis, and movable over and in cooperation with the scale 18 is a third hand 19. The timing gear train (not shown) for the hand 19 is such as to cause it to move at a speed corresponding to the graduations of the scale 18. In the present instance the scale 18 is so graduated as to include, in its complete circumference, five hours, and the timing of the hand 19 is such as to cause it to make a complete circuit of the scale 18, i. e., to move through 360°, in five hours. The mechanism for operating the hand 19 preferably includes means whereby said hand can be quickly returned to its starting or zero position at any time, and may likewise be started from this position at any time, which means may be substantially identical with the "snap back" and starting mechanism for the split second hand of an ordinary stop watch, which mechanism is well known and requires no description.

Surrounding and disposed concentric with the time scale 18, in a position likewise to cooperate with the hand 19, is an extensible and contractible combined distance and speed scale indicated as a whole at 20. The scale 20 includes indicia elements (hereinafter more fully described) constituting graduations whose spacing varies in constant ratio with the extension and contraction of the scale as a whole. One end of the scale 20, namely, what may be considered the zero end thereof, is fixed, as hereinafter more fully described, to the dial 14 at the zero (or, in the present instance, the five hour) point of the scale 18, and its opposite end is connected (as likewise hereinafter more fully described) to a bezel or ring 21 rotatably mounted on the watch or clock case 22, whereby rotation or circumferential movement of said bezel with respect to said case and the dial 14 will cause circumferential extension or contraction of the scale 20, thereby causing the indicia elements thereof to register with the graduations of the scale 18 in variable relationship. As shown, the bezel or ring 21 is formed with an outstanding annular flange 23 engaged by a guide ring 24 (secured by screws 25 to the case 22) with sufficient friction to retain the bezel in any angular position into which it is turned.

The scale 20 comprises a lazy tongs structure, certain of the joints of which carry distance interval indicia 26 to some of which may be attached tabs 27 bearing suitable numerals to denote units of distance or speed, for example, miles or miles per hour. The indicia 26 may comprise pointed strips carried by the pivots 28 of the innermost series of the lazy tongs joints and having slots 29 to receive the pivots 30 of the outermost series. The dial 14 is formed with a circular slot 31 in which are guided bushings 32 carried by the pivots 28, said bushings being retained on the pivot pins by heads 34 formed on the latter, and themselves having enlarged heads 33 received in a groove 35 formed in the dial backing plate 36 and registering with the slot 31. The bushing 31 on the pivot 28 at the zero end of the lazy tongs structure is fixed to the dial 14 by a nut 37 (see particularly Fig. 7) on said bushing and between which and the head 33 the dial is clamped. The pivot pin 28 at the opposite end of the lazy tongs structure is extended to pass through an opening in an arm 38 (Figs. 1 and 3) projecting radially inwardly from the bezel 21, the end of said pin being secured in said opening by a nut 39 between which and a shoulder on the pin said arm is clamped. The rim 40 of the bezel 21 is preferably sufficiently wide to cover the lazy tongs structure while exposing the pointed inner ends of the index strips 26 and the tabs 27. In order to prevent cramping, due to the curvilinear extension and contraction of the lazy tongs structure, while avoiding objectionable lost motion, the pivot pins 41 which constitute the intermediate series of lazy tongs joints are received in short longitudinal slots 42 (Fig. 6) in the crossed links.

The use of the above described timepiece is as follows. Prior to departure, the ground speed in miles per hour is estimated, and the bezel 21 is turned to cause the index element 26 of the scale 20 corresponding to that speed to register with the one hour point on the scale 18, at which point a special index mark 43 is, for convenience, preferably provided. As shown in Fig. 1, the scale 20 is set for a ground speed of 85 miles per hour. The hand 19 being in zero position is started in motion at the instant of departure. Thereafter the hand 19 will, at any moment, indicate on the scale 20 the distance traversed from the point of departure at that moment, assuming the correctness of the initially estimated ground speed for which the instrument has been set. As shown in Fig. 1, the hand 19 is in a position to indicate that approximately one hour and seven minutes has been consumed since the time of departure and that the plane has traveled 95 miles from the point of departure if the estimated ground speed of 85 miles per hour is correct. This ground speed can, however, be checked and verified, or the setting of the instrument corrected in this respect, at an early period in the flight, by selecting a recognizable landmark whose distance in miles from the point of departure is known or can be scaled on the map. At the time of arrival over said landmark the pilot can, if necessary, correct the setting of the instrument by turning the bezel 21 to bring said known distance on the scale 20 into register with the position of the hand 19 at that time, whereupon the actual ground speed will be indicated on the scale 20 opposite the index mark 43. Thereafter the hand 19 will, at all times correctly indicate on the scale 20 the distance covered, although the ground speed and the setting of the instrument can, from time to time, be rechecked and verified or corrected in the same manner by observing the time of arrival over other known landmarks.

The timepiece shown in Fig. 1 is suitable for use at ground speeds ranging from about 40 miles per hour to about 200 miles per hour, since, when the scale 20 is fully extended through 360° the index element 26 corresponding to 40 miles will be about opposite the index mark 43, and when the index element corresponding to 200 miles is about opposite said index mark the lazy tongs will be fully collapsed, as shown in Fig. 5. In order to adapt the instrument to a wider range of ground speeds, particularly higher speeds, the construction shown in Fig. 8 may be used.

In this construction the time scale 18, hand 19, index mark 43a (corresponding to the index mark 43) and extensible scale 200 (corresponding to the scale 20) may all be substantially as in the form of the invention first described, except that, for convenience, the index mark 43a is located radially of the dial slightly differently from the index mark 43, the index strips 260 are proportioned and disposed slightly differently from the strips 26, and the tabs 270 thereon are arranged and numbered slightly differently from the tabs 27, all as hereinafter pointed out. Surrounding and concentric with the time scale 18, and disposed between the latter and the extensible scale 200, is a second time scale 180 with which cooperates another hand 190. The speed of operation of the hand 190 is, in this instance, five times that of the hand 19, making a complete circuit of 360° in sixty minutes, the same as the regular minute hand 17, and the scale 180 is correspondingly graduated in minutes. As in the case of the hand 19, suitable "snap back" and starting mechanism is provided for the hand 190. The hands 19 and 190 are, for convenience, preferably differently colored, for example red and black, respectively, and the numerals on the time scales 18 and 180 are similarly colored to correspond with the respective hands with which they cooperate. The index mark 43a is colored to correspond to the hand 19 and scale 18 (e. g. red) and is, for convenience, located at the outer periphery of the scale 180. A similarly located index mark 430, colored to correspond to the hand 190 and scale 180 (e. g. black) is positioned at one half the angular distance, from the zero point of the scales, of that of the index mark 43a. The final digits of the numerals appearing on the tabs 270 of the scale 200 are colored to correspond to the hand 19 and scale 18 (e. g. red), the remaining digits being colored to correspond to the hand 190 and scale 180 (e. g. black). In the construction shown, a tab 270 is applied to each fifth index element or point 260, and the black numerals alone indicate five mile intervals, while the complete numerals (red and black) indicate fifty mile intervals.

For ground speeds between 80 and 400 miles per hour the (red) hand 19, scale 18, and index mark 43a, and the complete numerals (black and red digits) on the tabs 270 of the scale 200 are used, the mode of setting and subsequent reading being as in the form of the invention first above described, except that the graduation interval of the scale 200 is one half that of the scale 20, providing for a speed range of from 80 to 400 miles per hour instead of from 40 to 200 miles per hour as explained in connection with Fig. 1. For ground speeds between 40 and 200 miles per hour the (black) hand 190, scale 180, and index mark 430 are used, the complete (black and red digits) numerals on the tabs 270 being used for setting, and the black numerals only being used for reading distances covered, the setting and reading by the use of these elements being otherwise the same. For speeds between 80 and 200 miles per hour either the (red or black) hand 19 or 190 and index mark 43a or 430, and the corresponding (complete red and black or black alone) numerals on the tabs 270 may be used. Thus, as shown in Fig. 8, the parts are set for a ground speed of either 170 or 85 miles per hour. The index element 260 of the scale 200 corresponding to a speed of 170 miles per hour, when read in connection with the complete (black and red digits) numerals on the tabs 270, is in register with the (red) index mark 43a, and the (red) hand 19 will indicate distances travelled from the starting point on the scale 200 when read in the same manner; while the portion of the scale 200 corresponding to a speed of 85 miles per hour, when likewise read in connection with the complete (black and red digits) numerals, is in register with the (black) index mark 430, and the (black) hand 190 will indicate distances travelled on the scale 200 when the latter is read in connection with the black numerals on the tabs 270 only.

The above described lazy tongs scale construction and mounting will give reasonably accurate results if carefully and skilfully constructed, but in order to increase the accuracy, while reducing the care and skill required in construction, by eliminating the effects of backlash or lost motion due to looseness of joints, the arrangement shown in Figs. 9 to 11 may be employed.

The lazy tongs scale 201 shown in the last named figures is similar to the scales 20 and 200 above described, except that the index strips 261 (corresponding to the strips 26) are carried by the pivots 301 of the outermost series of the lazy tongs joints and have slots 291 to receive the pivots 281 of the innermost series. The dial 140 and its backing plate 360 are supported by, and in spaced relation to, a base plate 50 carried by the watch or clock case 22, by means of a spacer or bracket 51 carried by said base plate and to which the dial and its backing plate are secured by a screw 52. Extending between the base plate and dial is a central post 53 having an axial bore to receive the nested arbors of the several hands of the timepiece. Rotatably mounted at their inner ends on the post 53 are a series of radial arms 54, the outer end of one of which (designated 54a) is secured, as by a screw 55, to the base plate 50 opposite the fixed zero point of the dial 140 and scale 201, and the outer ends of the others of which carry rollers 56 guided on the outer margin of said base plate, the several arms being pivotally connected adjacent their outer ends with certain equally spaced pivots 301 of the outermost series of lazy tongs joints. As shown in Fig. 9, there are eight arms 54 and forty-three pivots 301, an arm being connected with every sixth pivot, including the endmost pivots of the series. The arm 54a connection with the pivot 301a at the zero end of the series is fixed, as above described, thereby fixing the zero end of the scale, while the pivot 301* at the opposite or free end of the series has an extension received in a socket 57 carried by the inner face of the rim 40 of the bezel 21. The bracket 51 is so shaped and positioned as to permit the circumferential expansion of the lazy tongs structure to about the extent shown in Fig. 9 without interfering with the angular movement of the arm 54* connected with the free end of said structure.

The angularly movable arms 54, connected as just described with the lazy tongs structure or scale 201 at spaced points, perform the function of the slot 31 and groove 35 of the construction first described in guiding the arcuate expansion and contraction of said scale. Also, by so controlling the angular movements of the several arms as to cause the angular approach or separation of adjacent arms to be in constant ratio throughout the series, the equal spacing of the index elements 261 throughout the length of the scale 201, as the latter is expanded or contracted, is preserved irrespective of any lost motion in the connecting joints.

To this end, the several arms 54 are connected by a supplemental or secondary lazy tongs structure comprising a series of crossed links 60. While this structure, and its connection with the arms 54, is uniform throughout the series, (with the exception of obvious minor variations in connection with the end arms 54a and 54*), its arrangement and mode of operation can best be explained with reference to three adjacent arms 54a, 54b, and 54c and their associated links 60w, 60x, 60y and 60z. The links 60w and 60z are connected, respectively, to the pivots 301a and 301c with which the arms 54a and 54c, respectively, are connected adjacent their outer ends. The links 60x and 60y are both connected at their outer ends to the common pivot 301b with which the arm 54b is connected adjacent its outer end. The link 60x carries at its inner end a roller 61a which is received in a slot 62a in the arm 54a. The links 60w and 60z, which cross, respectively, the links 60x and 60y carry a common roller 61b which is received in a slot 62b in the arm 54b. The link 60y carries at its inner end a roller 61c which is received in a slot 62c in the arm 54c, it being understood that the roller 61c is also common to the adjacent link 60d of the pair connecting the arm 54c with the next arm 54d of the series.

With this construction it will be seen that a given angular movement of the arm 54b with respect to the arm 54a (incidental to a given extension or contraction of the scale 201) will cause a swinging movement of the link 60w, a movement of the roller 61b in the slot 62b, a corresponding swinging movement of the link 60z, and an angular movement of the arm 54c with respect to the arm 54b equal to the angular movement of the arm 54b with respect to the arm 54a. In other words, the actual angular movement of the arm 54c will be twice that of the arm 54b. This multiplication of movement is carried forward throughout the series or system, so that the equi-angular spacing of the arms 54, and of the pivots 301 with which they are connected, irrespective of its magnitude, is preserved throughout the system as the scale 201 is extended or contracted.

I claim:

1. A timepiece comprising a graduated scale and a hand movable thereover, the spacing of the graduations of said scale and the speed of travel of said hand being relatively adjustable to cause said hand to indicate on said scale uniform and uniformly variable distances per units of time.

2. A timepiece comprising, in combination, an extensible and contractible scale having graduations whose spacing varies uniformly with the elongation and contraction of the scale as a whole, and a hand movable at constant speed over said scale, whereby to indicate on said scale readings per units of time inversely proportionate to the elongation of said scale.

3. A timepiece comprising, in combination, a scale having fixed graduations, an extensible and contractible scale having graduations whose spacing varies uniformly with the elongation and contraction of said scale as a whole, said first named scale having index means cooperating with the graduations of said extensible scale to indicate the extension of the latter, and a hand movable over and in indicating relationship to both of said scales.

4. A timepiece comprising, in combination, an arcuate extensible and contractible scale having graduations whose spacing varies with the elongation and contraction of said scale, means for guiding the arcuate expansion and contraction of said scale, and a hand angularly movable in indicating relation to said scale.

5. A timepiece comprising, in combination, an arcuate extensible and contractible scale having graduations whose spacing varies with the elongation and contraction of said scale, radial arms angularly movable about a common center and connected adjacent their outer ends with said scale at spaced points, and a hand angularly movable about said center in indicating relation to said scale.

6. A timepiece comprising, in combination, an extensible and contractible scale comprising a lazy tongs at least some of the joints of which are provided with indicia whose spacing varies with the extension and contraction of said lazy tongs, and a hand movable in indicating relationship to said scale.

7. A timepiece comprising, in combination, an arcuate, circumferentially extensible and contractible scale comprising a lazy tongs at least some of the joints of which are provided with indicia whose spacing varies with the extension and contraction of said lazy tongs, and a hand angularly movable in indicating relationship to said scale.

8. A timepiece comprising, in combination, an arcuate extensible and contractible scale comprising a lazy tongs at least some of the joints of which are provided with indicia whose spacing varies with the extension and contraction of said lazy tongs, means for guiding the arcuate expansion and contraction of said lazy tongs, and a hand angularly movable in indicating relation to said scale.

9. A timepiece comprising, in combination, an arcuate extensible and contractible scale comprising a lazy tongs at least some of the joints of which are provided with indicia whose spacing varies with the extension and contraction of said lazy tongs, radial arms angularly movable about a common center and connected adjacent their outer ends with certain of the joints of said lazy tongs, and a hand angularly movable about said center in indicating relation to said scale.

10. A timepiece comprising, in combination, an extensible and contractible scale having graduations whose spacing varies with the elongation of the scale, and a plurality of hands movable at constant but different speeds over and in indicating relation to said scale.

11. A timepiece comprising, in combination, an extensible and contractible scale having graduations whose spacing varies with the elongation of the scale, a plurality of hands movable at constant but different speeds over and in indicating relation to said scale, and scales cooperating with said hands respectively and having fixed graduations spaced to correspond to the speed of movement of the respective hands, said last named scales having differently positioned index elements cooperating with the graduations of the extensible scale to indicate the setting of the latter with reference to the cooperation therewith of the respective hands.

12. A timepiece comprising, in combination, a dial, a hand angularly movable thereover, an angularly adjustable bezel surrounding said dial, and an arcuate, circumferentially extensible scale having graduations whose spacing varies with the extension and contraction of said scale and with which said hand cooperates, said scale being connected at spaced points with said dial and bezel, respectively.

13. In a timepiece of the character described, an arcuate, circumferentially extensible and contractible scale comprising a lazy tongs at least some of the joints of which are provided with indicia, radial arms angularly movable about the center of said scale and connected adjacent their outer ends with certain of the joints of said lazy tongs, and means for causing the spacing of said indicia to vary in constant ratio with the extension and contraction of said lazy tongs.

14. In a timepiece of the character described, an arcuate, circumferentially extensible and contractible scale comprising a lazy tongs at least some of the joints of which are provided with indicia, radial arms angularly movable about the center of said scale and connected adjacent their outer ends with certain of the joints of said lazy tongs, and crossed links connecting said last named joints with the next adjacent arms, the inner ends of each pair of adjacent links having a common, radially movable, pivotal connection with the arms with which they are connected.

15. In a timepiece of the character described, an arcuate, circumferentially extensible and contractible scale comprising a lazy tongs at least some of the joints of which are provided with indicia, radial arms angularly movable about the center of said scale and connected adjacent their outer ends with certain of the joints of said lazy tongs, and crossed links connecting said last named joints with the next adjacent arms, the inner ends of each pair of adjacent links having a common, radially movable, pivotal connection with the arm with which they are connected, in combination with a hand angularly movable at constant speed about said center in indicating relation to said scale.

16. A timepiece comprising, in combination, an extensible and contractible scale having graduations whose spacing varies with the elongation and contraction of said scale, means for extending and contracting said scale and thereby varying the spacing of the said graduations, and a hand movable over said scale to indicate thereon readings per units of time variable in accordance with the elongation or contraction of said scale.

17. A timepiece comprising a scale graduated in distances and a hand movable thereover at a speed proportional to elapsed time, the graduations on said scale being adjustable in such manner as to cause said hand to indicate on said scale uniform and uniformly variable distance per units of time.

18. A timepiece comprising a stationary scale graduated in units of time, a hand movable thereover at a speed proportional to elapsed time, a second scale mounted adjacent to said first named stationary scale, said second scale being fixed at one end and having thereon graduations in distances, the graduations being simultaneously movable distances proportional to their distances from said fixed point, said hand indicating on said second scale uniform and uniformly variable distances per units of time, such variable distances depending upon the position of said graduations on said second scale with respect to said stationary scale.

JOHN P. PUTNAM.